United States Patent
Lee et al.

(10) Patent No.: US 9,625,190 B2
(45) Date of Patent: Apr. 18, 2017

(54) MOTOR DRIVING DEVICE AND AIR CONDITIONER INCLUDING THE SAME

(71) Applicant: LG ELECTRONICS INC., Seoul (KR)

(72) Inventors: Jongwan Lee, Seoul (KR); Gwigeun Park, Seoul (KR); Eungho Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/733,601

(22) Filed: Jun. 8, 2015

(65) Prior Publication Data
US 2015/0354870 A1    Dec. 10, 2015

(30) Foreign Application Priority Data

Jun. 9, 2014  (KR) .......................... 10-2014-0069654

(51) Int. Cl.
*F25B 31/02* (2006.01)
*H02P 27/06* (2006.01)
(Continued)

(52) U.S. Cl.
CPC .......... *F25B 31/02* (2013.01); *F24F 11/0009* (2013.01); *F24F 11/0079* (2013.01);
(Continued)

(58) Field of Classification Search
CPC . F25D 17/00; F24F 11/0079; F25B 2600/021; F25B 31/02; H02M 2001/007; Y02B 30/746
See application file for complete search history.

(56) References Cited

U.S. PATENT DOCUMENTS 5,634,352 A * 6/1997 Nagai .................. F16K 11/065
                                                    62/278
6,153,993 A * 11/2000 Oomura .................. H02P 6/12
                                                    318/434
(Continued)

FOREIGN PATENT DOCUMENTS

EP    0 608 769 A2    1/1994
EP    0 698 769 A1    2/1996
(Continued)

OTHER PUBLICATIONS

European Search Report for Application EP 15 17 1042 dated Nov. 10, 2015.

*Primary Examiner* — Shawki S Ismail
*Assistant Examiner* — Muhammad S Islam
(74) *Attorney, Agent, or Firm* — KED & Associates LLP (57) ABSTRACT

A motor driving device and an air conditioner including the same are disclosed. The motor driving device includes a rectifier to rectify input AC power, a boost converter for boosting the rectified power from the rectifier, a first capacitor to store a pulsating voltage from the boost converter, a first inverter for outputting, to a compressor motor, AC power transformed using a voltage across the first capacitor, a second capacitor to store the rectified power from the rectifier, a second inverter for outputting, to a first fan motor, AC power transformed using a voltage across the second capacitor, and a voltage dropper to drop the voltage across the second capacitor, and to output the dropped voltage. In accordance with this configuration, the compressor motor and fan motor can be driven, using the same input AC power, even though the motor driving device uses a low-capacitance capacitor.

18 Claims, 11 Drawing Sheets

(51) Int. Cl.
  *F25B 49/02* (2006.01)
  *F24F 11/00* (2006.01)
  *H02M 1/42* (2007.01)
  *H02P 5/74* (2006.01)
  *H02M 1/00* (2006.01)

(52) U.S. Cl.
  CPC ......... *F25B 49/025* (2013.01); *H02M 1/4225* (2013.01); *H02P 5/74* (2013.01); *H02P 27/06* (2013.01); *F25B 2600/021* (2013.01); *H02M 2001/007* (2013.01); *H02M 2001/008* (2013.01); *Y02B 30/746* (2013.01)

(56) References Cited

U.S. PATENT DOCUMENTS

| | | |
|---|---|---|
| 6,397,611 B1 | 6/2002 | Yamato et al. |
| 8,040,083 B2* | 10/2011 | Okamura .............. B60L 11/123 180/65.1 |
| 8,575,778 B2* | 11/2013 | Chen .................... B60L 11/123 307/66 |
| 2009/0021198 A1* | 1/2009 | Okamura .............. B60K 6/445 318/400.3 |
| 2009/0113908 A1* | 5/2009 | Hwang ................ F24F 11/0079 62/228.1 |
| 2010/0176757 A1* | 7/2010 | Yamakawa ....... H02M 7/53873 318/400.09 |
| 2011/0170318 A1* | 7/2011 | Chen .................... B60L 11/123 363/16 |

FOREIGN PATENT DOCUMENTS

| | | |
|---|---|---|
| EP | 2 072 923 A1 | 6/2009 |
| WO | WO 2007/061186 A1 | 5/2007 |

* cited by examiner

MOTOR DRIVING DEVICE AND AIR CONDITIONER INCLUDING THE SAME

CROSS-REFERENCE TO RELATED APPLICATION

This application claims the priority benefit of Korean Patent Application No. 10-2014-0069654, filed on Jun. 9, 2014 in the Korean Intellectual Property Office, the disclosure of which is incorporated herein by reference.

BACKGROUND

1. Field

The present invention relates to a motor driving device and an air conditioner including the same, and more particularly to a motor driving device capable of driving both a compressor motor and a fan motor, using the same input AC power under the condition that the motor driving devices employs a low-capacitance capacitor and an air conditioner including the same.

2. Background

An air conditioner is installed to provide a pleasant indoor environment to persons by adjusting indoor temperature and conditioning indoor air through discharge of hot or cold air into an indoor space. Generally, such an air conditioner includes an indoor unit installed in an indoor space while including a heat exchanger, and an outdoor unit including a compressor and a heat exchanger, to supply refrigerant to the indoor unit.

SUMMARY OF THE INVENTION

It is an object of the present invention to provide a motor driving device capable of driving both a compressor motor and a fan motor, using the same input AC power under the condition that the motor driving devices employs a low-capacitance capacitor and an air conditioner including the same.

In accordance with an aspect of the present invention, the above and other objects can be accomplished by the provision of a motor driving device including a rectifier to rectify input AC power, a boost converter to boost the rectified power from the rectifier, and to output the boosted power, a first capacitor to store a pulsating voltage from the boost converter, a first inverter including a plurality of switching elements, the first inverter outputting, to a compressor motor, AC power transformed using a voltage across the first capacitor, a second capacitor to store the rectified power from the rectifier, a second inverter including a plurality of switching elements, the second inverter outputting, to a first fan motor, AC power transformed using a voltage across the second capacitor, and a voltage dropper to drop the voltage across the second capacitor, and to output the dropped voltage.

In another aspect of the present invention, there is provided an air conditioner including a compressor to compress a refrigerant, a heat exchanger to perform heat exchange, using the compressed refrigerant, and a compressor motor driving device to drive a motor equipped in the compressor, wherein the compressor motor driving device includes a rectifier to rectify input AC power, a boost converter to boost the rectified power from the rectifier, and to output the boosted power, a first capacitor to store a pulsating voltage from the boost converter, a first inverter including a plurality of switching elements, the first inverter outputting, to a compressor motor, AC power transformed using a voltage across the first capacitor, a second capacitor to store the rectified power from the rectifier, a second inverter including a plurality of switching elements, the second inverter outputting, to a first fan motor, AC power transformed using a voltage across the second capacitor, and a voltage dropper to drop the voltage across the second capacitor, and to output the dropped voltage.

BRIEF DESCRIPTION OF THE DRAWINGS

Embodiments will be described in detail with reference to the following drawings in which like reference numerals refer to like elements and wherein.

FIG, 8 is a circuit diagram illustrating a motor driving device according to another embodiment of the present invention.

FIG, 10 is a circuit diagram illustrating a motor driving device according to another embodiment of the present invention.

DETAILED DESCRIPTION

Hereinafter, the present invention will be described with reference to the drawings for explaining cell module assemblies according to embodiments of the present invention.

Although "module" or "unit" is suffixed to constituent elements described in the following description, this is intended only for ease of description of the specification. The suffixes themselves have no meaning or function to distinguish the constituent element using the suffix from the constituent element using no suffix. The suffixes "module" and "unit" may be used interchangeably.

Figure 1:
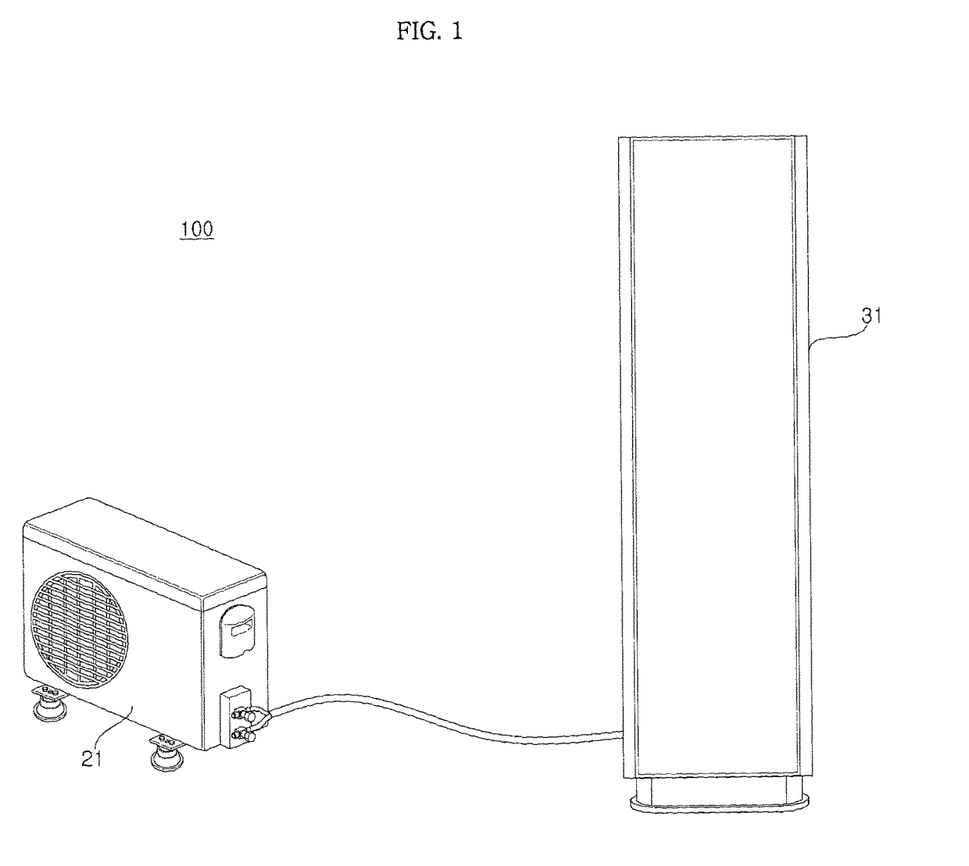
FIG. 1 is a view illustrating a configuration of an air conditioner according to an embodiment of the present invention.

FIG. 1 is a view illustrating a configuration of an air conditioner according to an embodiment of the present invention.

As illustrated in FIG. 1, the air conditioner, which is designated by reference numeral "100", may include an indoor unit 31, and an outdoor unit connected to the indoor unit 31.

The indoor unit 31 may be applied to any one of a stand type air conditioner, a wall-mounted air conditioner and a ceiling-mounted air conditioner is applicable. For convenience of description, however, the following description will be given only in conjunction with a stand type indoor unit.

Meanwhile, the air conditioner 100 may further include at least one of a ventilator, an air cleaner, a humidifier, and a heater. These devices may be operatively connected to the indoor unit and outdoor unit.

The outdoor unit 21 includes a compressor (not shown) for compressing refrigerant supplied thereto, an outdoor heat exchanger (not shown) for exchanging heat between refrigerant and outdoor air, an accumulator (not shown) for separating gaseous refrigerant from refrigerant supplied thereto, and supplying the separated gaseous refrigerant to the compressor, and a 4-way valve (not shown) for selecting a flow path of refrigerant according to heating operation. Although the outdoor unit further includes a plurality of sensors, a plurality of valves, and an oil collector, etc., no description will be given of configurations of these elements.

The outdoor unit 21 operates the compressor and outdoor heat exchanger included therein, to perform compression and heat exchange of refrigerant, and supplies the resultant refrigerant to the indoor unit. The outdoor unit 21 is driven in accordance with a demand from the remote control unit (not shown) or the indoor unit 31. In an embodiment of the present invention, the air conditioner 100 may include a plurality of indoor units, and a plurality of outdoor units each connected to associated ones of the indoor units. Thus, the number of operating outdoor units and the number of operating compressors included in the operating outdoor units are varied as the cooling/heating capacity of the air conditioner is varied in accordance with the number of operating indoor units.

The outdoor unit 21 supplies compressed refrigerant to the indoor unit 31 connected thereto.

The indoor unit 31 receives refrigerant from the outdoor unit 21, and discharges cold or hot air to an indoor space. The indoor unit 31 includes an indoor heat exchanger (not shown), an indoor fan (not shown), an expansion valve (not shown) to expand refrigerant supplied thereto, and a plurality of sensors (not shown).

The outdoor unit 21 and indoor unit 31 are connected by a communication line and, as such, receive and transmit data therebetween. The outdoor unit 21 and indoor unit 31 are connected to a remote control unit (not shown) in a wired or wireless manner and, as such, operate under control of the remote control unit (not shown).

A remote controller (not shown) is connected to the indoor unit 31 and, as such, may input a control command from the user to the indoor unit 31, and may receive state information from the indoor unit 31, to display the received state information. In this case, the remote controller communicates with the indoor unit 31 in a wired or wireless manner in accordance with the connection type thereof.

Figure 2:
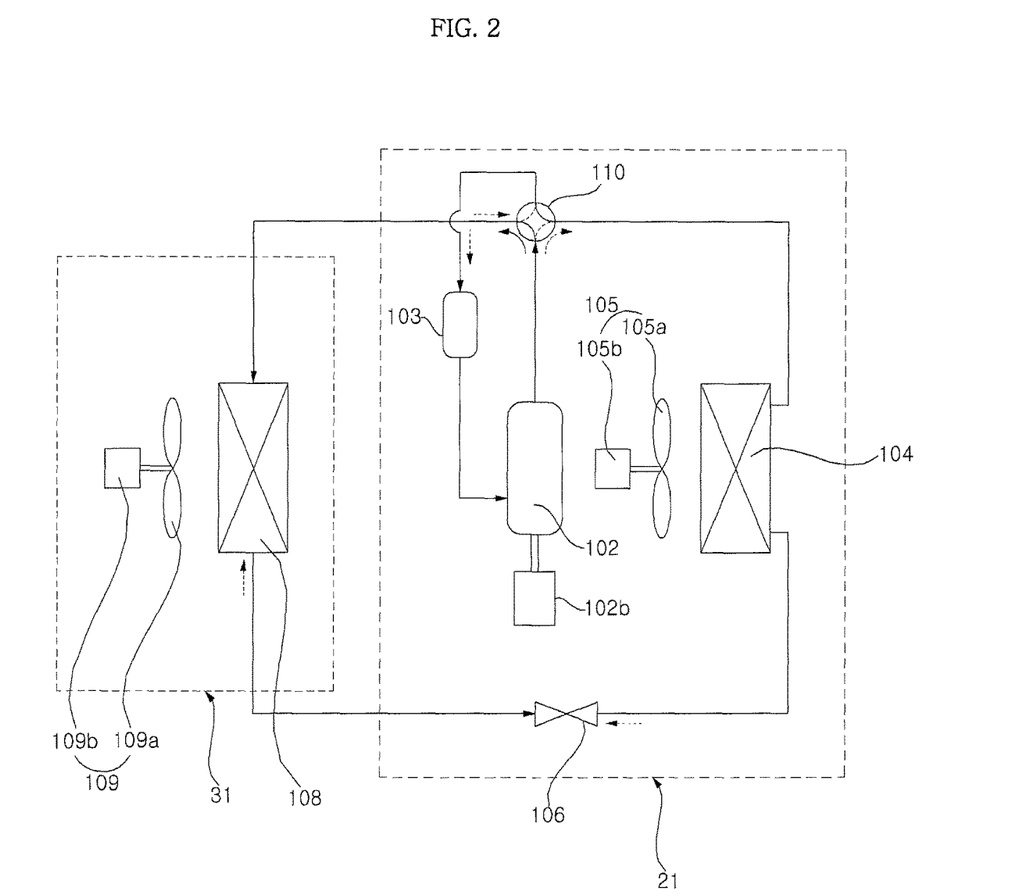
FIG. 2 is a schematic view of one outdoor unit and one indoor unit, which are included in the air conditioner of FIG. 1.

FIG. 2 is a schematic view of the outdoor unit and indoor unit illustrated in FIG. 1.

Referring to FIG. 2, the air conditioner 100 mainly includes an indoor unit, for example, the indoor unit 31, and an outdoor unit, for example, the outdoor unit 21.

The outdoor unit 21 includes a compressor 102 functioning to compress refrigerant, a compressor motor 102b to drive the compressor 102, an outdoor heat exchanger 104 functioning to discharge heat from the compressed refrigerant, and an outdoor blowing unit 105 including an outdoor fan 105a disposed at one side of the outdoor heat exchanger 104, to promote heat discharge of refrigerant, and a motor 105b to rotate the outdoor fan 105a. The outdoor unit 21 further includes an expansion device 106 to expand concentrated refrigerant, a cooling/heating switching valve 110 to change a flow path of compressed refrigerant, and an accumulator 103 to temporarily store gasified refrigerant, and then to supply the stored refrigerant to the compressor at a constant pressure after removing moisture and foreign matter from the refrigerant.

The indoor unit 31 includes an indoor heat exchanger 108 disposed in an indoor space, to perform a cooling/heating function, and an indoor blowing unit 109 including an indoor fan 109a disposed at one side of the indoor heat exchanger 108, to promote heat discharge of refrigerant, and a motor 109b to rotate the indoor fan 109a.

The indoor unit 31 may include at least one indoor heat exchanger 108. As the compressor 102, at least one of an inverter compressor and a constant speed compressor may be used.

Meanwhile, the air conditioner 50 may be configured as a cooler to cool an indoor space. Alternatively, the air conditioner 50 may be configured as a heat pump to cool or heat an indoor space.

Figure 3:
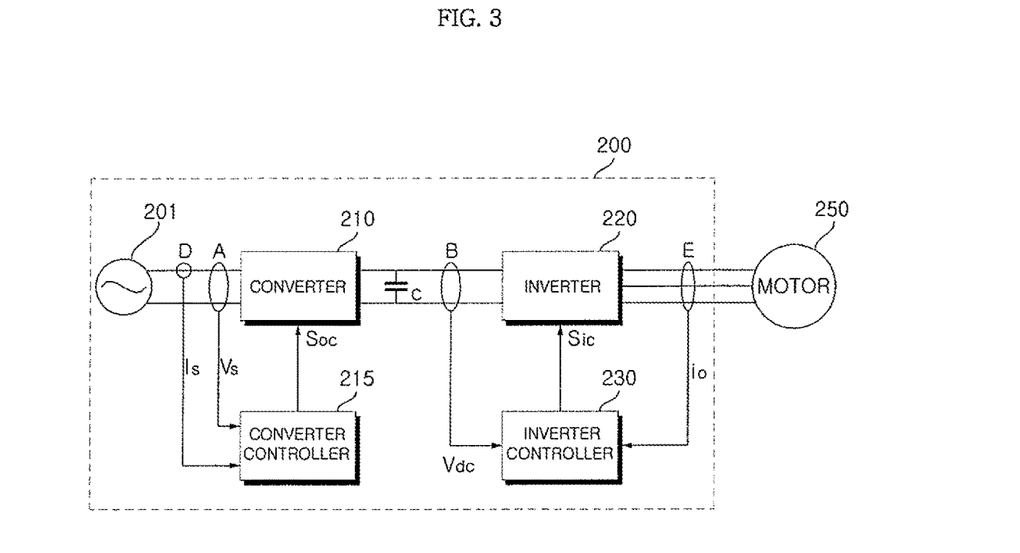
FIG. 3 is a block diagram illustrating a motor driving device included in the outdoor unit of FIG. 1.

The compressor 102 included in the outdoor unit 21 of FIG. 1 may be driven by a motor driving device 200 (FIG. 3) to drive a compressor motor 250 (FIG. 3).

Figure 4:
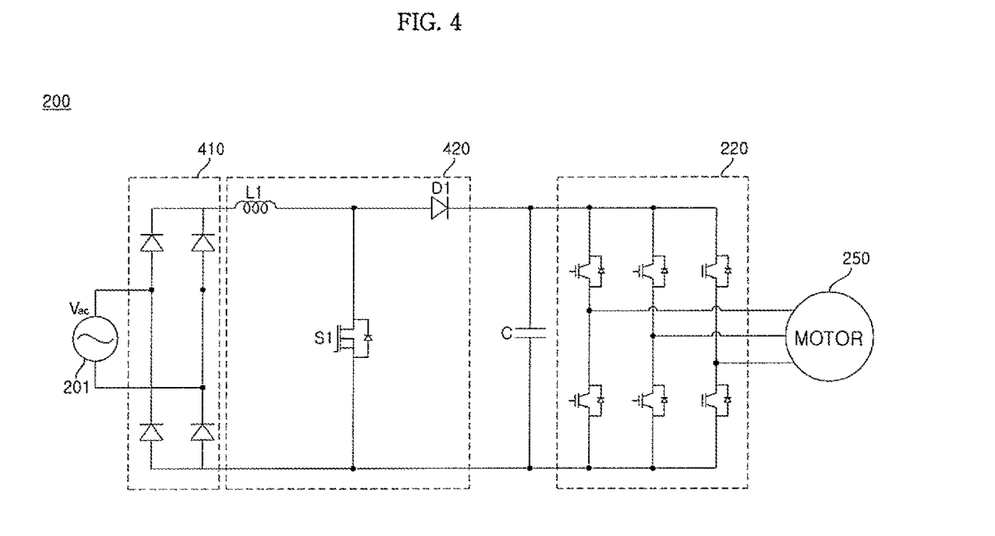
FIG. 4 is a circuit diagram illustrating the motor driving device of FIG. 3.

FIG. 3 is a block diagram illustrating a motor driving device included in the outdoor unit of FIG. 1. FIG. 4 is a circuit diagram illustrating the motor driving device of FIG. 3.

Referring to FIGs. 3 and 4, the motor driving device 200 may include an inverter 220 to output 3-phase AC current to the compressor motor 250, an inverter controller 230 to control the inverter 220, and a converter 210 to supply DC power to the inverter 220. The compressor motor driving device 200 may further include a converter controller 215 to control the converter 210, and a DC link capacitor C arranged between the converter 210 and the inverter 220. Meanwhile, the motor driving device 200 may further include a DC link voltage detector B, an input voltage detector A, an input current detector D, and an output current detector E.

The motor driving device 200 receives AC power from a power supply system, converts the received power, and then supplies the converted power to the compressor motor 250. In this regard, the motor driving device 200 may be referred to as a "power converting device".

Meanwhile, in accordance with an embodiment of the present invention, the DC link capacitor employed in the motor driving device 200 has a low capacitance of several tens of μF or less. For example, the low-capacitance DC link capacitor C may include a film capacitor rather than an electrolytic capacitor.

When the low-capacitance DC link capacitor C is used, DC link voltage is pulsated due to increased variation thereof and, as such, little or no smoothing operation of the DC link capacitor is achieved.

The motor driving device, which includes a DC link capacitor having a low capacitance of several tens of μF or less, as described above, may be referred to as a "capacitorless motor driving device".

The following description will be given of the motor driving device 200, which includes the low-capacitance DC link capacitor C.

In accordance with the illustrated embodiment of the present invention, the converter 210 converts input AC power into DC power. To this end, the converter 210 may include a rectifier 410 and a boost converter 420.

The rectifier 410 rectifies single-phase AC power 201 input thereto, and outputs the rectified power.

For this function, the rectifier 410 has a configuration in which two pairs of arm switching elements are connected in parallel, and each arm switching element pair includes an upper arm switching element and a lower arm switching element, which are connected in series, such that the arm switching elements are connected in a bridged manner.

The boost converter 420 may include an inductor L1 and a diode D1, which are connected in series between the rectifier 410 and the inverter 220. The boost converter 420 may further include a switching element S1 connected between the inductor L1 and the diode D1. When the switching element S1 turns on, energy is stored in the inductor L1. When the switching element S1 turns off, the energy stored in the inductor L1 may be output via the diode D1.

In particular, in the motor driving device 200 using the low-capacitance DC link capacitor C, a voltage boosted to a certain level, namely, an offset voltage, may be output from the boost converter 420.

The converter controller 215 may control turning-on timing of the switching element S1 in the boost converter 420. For this function, the converter controller 215 may output a converter switching control signal Scc for turning-on timing of the switching element S1.

To this end, the converter controller 215 may receive an input voltage Vs from the input voltage detector A and an input current Is from the input current detector B.

The input voltage detector A may detect an input voltage Vs from the input AC power 201. The input voltage detector A may be arranged upstream of the rectifier 410.

For detection of voltage, the input voltage detector A may include a resistor, an operational amplifier (OP AMP), etc. The detected input voltage Vs may be a pulse type discrete signal. The detected input voltage Vs may be applied to the converter controller 215, for generation of the converter switching control signal Scc.

Meanwhile, a zero crossing point of the input voltage may also be detected by the input voltage detector A.

The input current detector D may detect an input voltage Is from the input AC power 201. In detail, the input current detector D may be arranged upstream of the rectifier 410.

For detection of current, the input current detector D may include a current sensor, a current transformer (CT), a shunt resistor, etc. The detected input current Is may be a pulse type discrete signal. The detected input current Is may be applied to the converter controller 215, for generation of the converter switching control signal Scc.

The DC voltage detector B may detect a pulsating voltage Vdc across the DC link capacitor C. For detection of voltage, the DC voltage detector B may include a resistor, an operational amplifier (OP AMP), etc. The detected voltage Vdc across the DC link capacitor C may be a pulse type discrete signal. The detected voltage Vdc may be applied to the inverter controller 230. An inverter switching control signal Sic may be generated, based on the DC voltage Vdc across the DC link capacitor C.

On the other hand, in accordance with another embodiment different from the illustrated embodiment, the detected DC link voltage Vdc may be applied to the converter controller 215, for generation of the converter switching control signal Scc.

The inverter 220 may include a plurality of inverter switching elements in order to convert smoothed DC power into 3-phase AC power having a predetermined frequency and then to output the 3-phase AC power to the compressor motor 250, which may be a 3-phase motor, in accordance with ON/OFF operations of the switching elements.

In detail, the inverter 220 includes a plurality of switching elements. For example, the inverter 220 may include three pairs of arm switching elements connected in parallel. Each arm switching element pair includes an upper arm switching element and a lower arm switching element, which are connected in series. A diode is connected to each arm switching element in anti-parallel.

The inverter controller 230 may output an inverter switching control signal Sic to the inverter 220, to control switching operation of the inverter 220. The inverter switching control signal Sic is a pulse width modulated (PWM) switching control signal. The inverter switching control signal Sic may be generated, based on an output current $i_o$ flowing through the motor 250 or a DC link voltage Vdc across the DC link capacitor C. In this case, the output current $i_o$ may be detected by an output current detector E, and the DC link voltage Vdc may be detected by the DC link voltage detector B.

The output current detector E may detect the output current $i_o$ flowing between the inverter 220 and the motor 250. That is, the output current detector E detects a current flowing through the motor 250. The output current detector E may detect output currents of all phases, namely, output currents $i_a$, $i_b$, and $i_c$. Alternatively, the output current detector E may detect output currents of two phases through balance among three phases.

The output current detector E may be arranged between the inverter 220 and the motor 250. For current detection, a current transformer (CT), a shunt resistor, etc. may be employed as the output current detector E.

The inverter controller 230 may include a first axial transformer (not shown), a velocity calculator (not shown), a current command generator (not shown), a voltage command generator (not shown), a second axial transformer (not shown), and a switching control signal output unit (not shown).

The first axial transformer (not shown) receives 3-phase output currents $i_a$, $i_b$, and $i_c$ detected by the output current detector E, and transforms the 3-phase output currents $i_a$, $i_b$, and $i_c$ into 2-phase currents $i_\alpha$ and $i_\beta$ in a stationary reference frame.

Meanwhile, the first axial transformer (not shown) may transform the two-phase currents $i_\alpha$ and $i_\beta$ in the stationary reference frame into 2-phase currents $i_d$ and $i_q$ in a rotating reference frame.

The velocity calculator (not shown) may calculate a velocity $\hat{\omega}_r$, based on a rotor position signal H input from a position sensor (not shown). That is, it is possible to calculate the velocity $\hat{\omega}_r$ by dividing a rotor position based on the position signal by time.

Meanwhile, the position sensor (not shown) may sense a rotor position of the motor 250. For this function, the position sensor (not shown) may include a Hall sensor.

Meanwhile, the velocity calculator (not shown) may output a position $\hat{\theta}_r$ and a velocity $\hat{\omega}_r$, which are calculated, based on the rotor position signal H input to the velocity calculator.

Meanwhile, the current command generator (not shown) calculates a velocity command value $w^*_r$, based on the calculated velocity $\hat{\omega}_r$ and a target velocity $\omega$. The current command generator (not shown) also generates a current command value $i^*_q$, based on the velocity command value $\omega^*_r$. For example, the current command generator (not shown) may perform proportional-integral (PI) control through a PI controller included therein, based on a difference between the calculated velocity $\hat{\omega}_r$ and the target velocity ω, namely, the velocity command value ω*$_r$, and, as such, may generate a current command value i*$_q$. Although the current command generator generates the current command value i*$_q$, namely, a q-axis current command value, it may be possible to generate a d-axis current command value i*$_d$, together with the q-axis current command value i*$_q$. The d-axis current command value i*$_d$ may be set to "0".

Meanwhile, the current command generator (not shown) may further include a limiter (not shown) to limit the level of the current command value i*$_q$ in order to prevent the current command value i*$_q$ from being outside a predetermined range.

The voltage command generator (not shown) generates d and q-axis voltage command values v*$_d$ and v*$_q$, based on d and q-axis currents i$_d$ and i$_q$ generated through axial transformation to a 2-phase rotating reference frame in the first axial transformer and current command values i*$_d$ and i*$_q$ from the current command generator (not shown). For example, the voltage command generator (not shown) may perform PI control through the PI controller, based on a difference between the q-axis current i$_q$ and the q-axis current command value i*$_q$ and, as such, may generate a q-axis voltage command value v*$_q$. The voltage command generator (not shown) may additionally perform PI control through the PI controller, based on a difference between the d-axis current i$_d$ and the d-axis current command value i*$_d$ and, as such, may generate a d-axis voltage command value v*$_d$. When the d-axis current command value i*$_d$ is set to "0", the d-axis voltage command value v*$_d$ may be set to "0".

Meanwhile, the voltage command generator (not shown) may further include a limiter (not shown) to limit the levels of the voltage command values v*$_d$ and v*$_q$ in order to prevent the voltage command values v*$_d$ and v*$_q$ from being outside a predetermined range.

The generated d and q-axis voltage command values v*$_d$ and v*$_q$ are input to the second axial transformer (not shown).

The second axial transformer (not shown) receives the position $\hat{\theta}_r$ calculated by the velocity calculator (not shown) and the d and q-axis voltage command values v*$_d$ and v*$_q$ and, as such, perform axial transformation.

First, the second axial transformer (not shown) performs transformation from a 2-phase rotating reference frame to a 2-phase stationary reference frame. In this case, the position θr calculated by the velocity calculator (not shown) may be used.

The second axial transformer (not shown) performs transformation from a 2-phase stationary reference frame to a 3-phase stationary reference frame. Through the axial transformation, the second axial transformer (not shown) outputs 3-phase output voltage command values v*a, v*b, and v*c.

The switching control signal output unit (not shown) generates an inverter switching control signal Sic according to PWM, based on the 3-phase output voltage command values v*a, v*b, and v*c.

The inverter switching control signal Sic output from the switching control signal output unit (not shown) may be converted into a gate drive signal in a gate driver (not shown). The gate drive signal may be input to the gate of each switching element in the inverter 220. As a result, the switching elements in the inverter 220 perform switching operations, respectively.

FIGS. 5A to 6B are diagrams explaining operation of the motor driving device illustrated in FIG. 4.

Figure 5A:
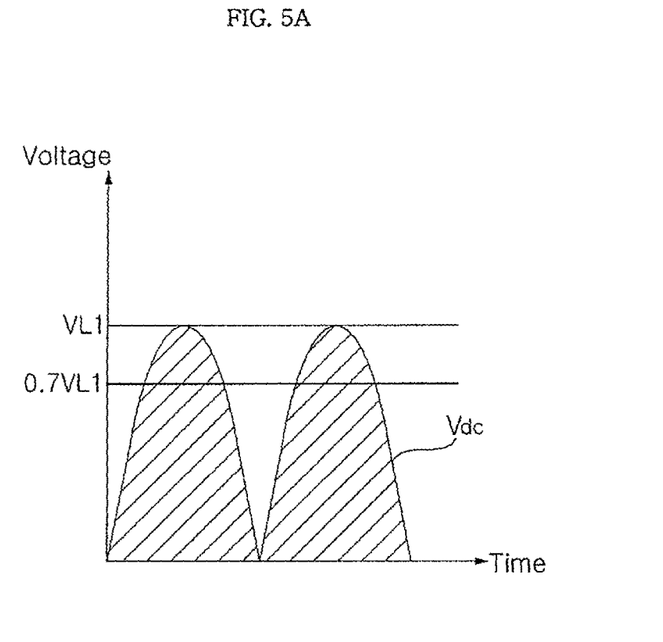
FIG. 5A is a graph showing voltage versus time in order to explain operation of the motor driving device illustrated in FIG. 4.

FIG. 5A illustrates a DC link voltage Vdc generated in the case in which the low-capacitance DC link capacitor C is connected to the rectifier 410 without using the boost converter 420 of FIG. 4.

When the low-capacitance DC link capacitor C is used, the DC link voltage Vdc cannot be smoothed by the low-capacitance DC link capacitor C and, as such, is directly applied in a pulsating state to the inverter 220.

In this case, the pulsating DC link voltage Vdc has an average voltage level of about 0.7VL1 lower than a peak voltage level VL1.

The inverter 220 may generate 3-phase AC power, using a voltage of about 0.7VL1. However, it is difficult to achieve smooth motor driving at a voltage level lower than about 0.7VL1. For this reason, voltage usage rate becomes low.

Meanwhile, when an input voltage has a frequency of about 60 Hz, voltage ripple of about 120 Hz corresponding to twice the frequency of the input voltage may be generated.

Figure 5B:
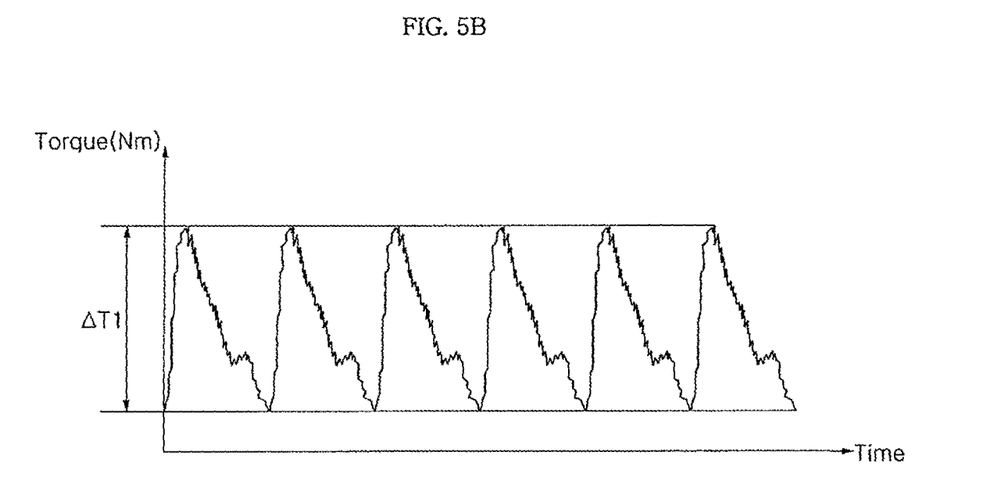
FIG. 5B is a graph showing torque versus time in order to explain operation of the motor driving device illustrated in FIG. 4.

When the motor 250 is driven though the inverter 220, using a pulsating voltage as illustrated in FIG. 5A, torque ripple corresponding to ΔT1 is generated, as illustrated in FIG. 5B. Due to such torque ripple, vibration and noise are generated.

Meanwhile, when the low-capacitance DC link capacitor C has a reduced capacitance, current control thereof may be impossible and, as such, low input power factor characteristics may be exhibited.

In order to solve such a problem, the boost converter 420 is arranged downstream of the rectifier 410 in accordance with the illustrated embodiment of the present invention, as illustrated in FIG. 4.

Figure 6A:
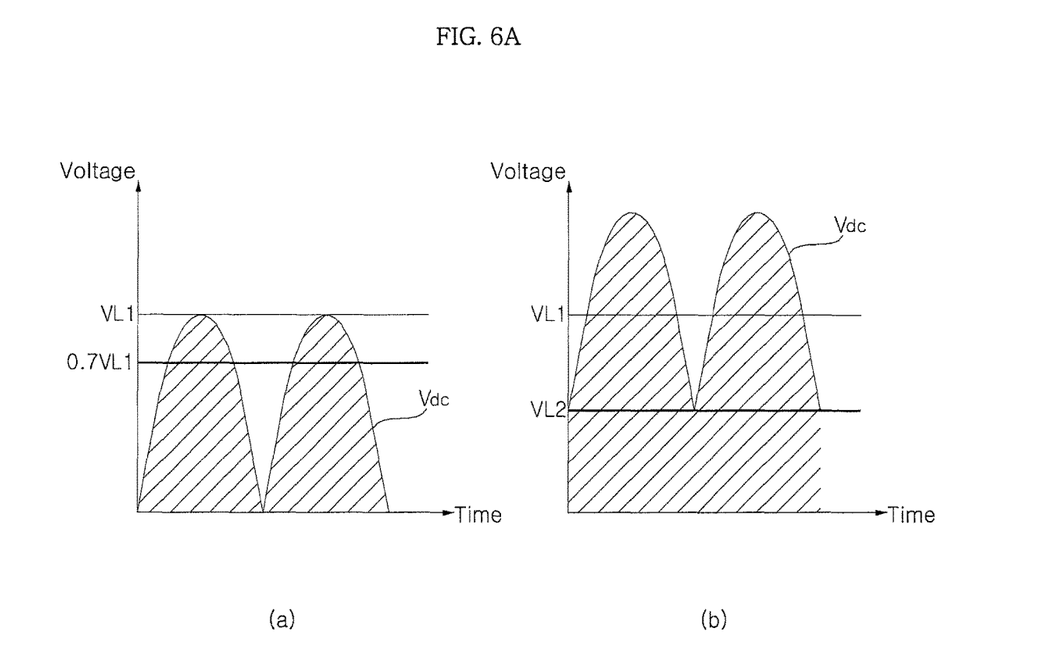
FIG. 6A is a graph showing voltage versus time in order to explain operation of the motor driving device.

FIG. 6A illustrates a DC link voltage Vdc generated in the case in which the boost converter 420 and low-capacitance DC link capacitor C are used.

When the DC link voltage Vdc is boosted by VL2, using the boost converter 420, a pulsating voltage having a minimum voltage level of VL2 and a peak voltage level of VL2+VL1 is output to a DC link. In this case, the DC link voltage Vdc has an average voltage level of about VL1.

Since the inverter 220 generates 3-phase AC power, using a voltage of about VL1, it may be possible to achieve smooth motor driving in a large portion of the overall voltage period. Accordingly, increased voltage usage rate is exhibited. In addition, an operation range of the motor is widened.

Figure 6B:
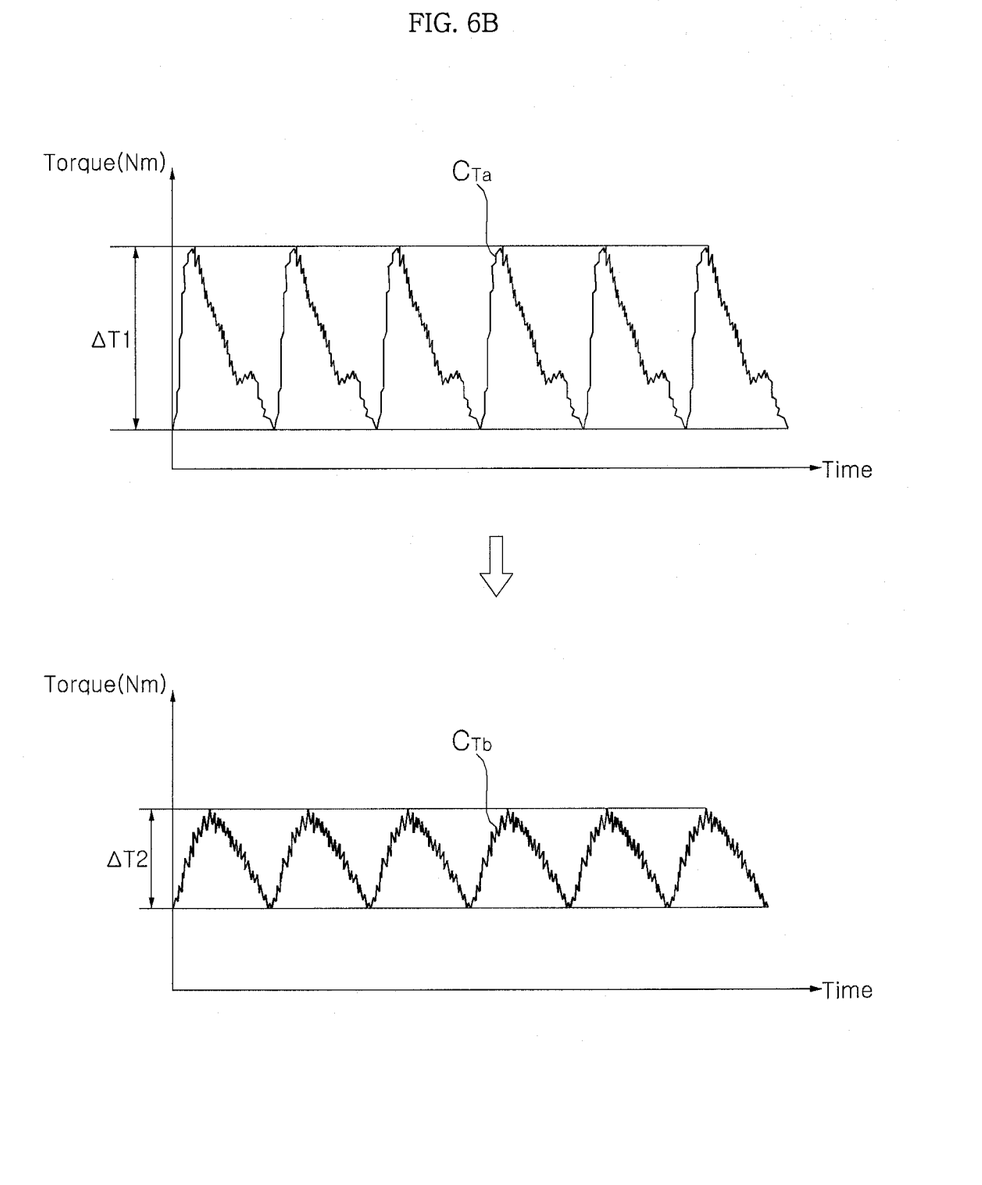
FIG. 6B is a graph showing voltage versus time in order to explain operation of the motor driving device.

When the motor 250 is driven though the inverter 220, using a DC link voltage Vdc generated in accordance with use of the boost converter 420 and the low-capacitance DC link capacitor C, as illustrated in FIG. 6A, torque ripple corresponding to ΔT2 smaller than ΔT1 may be generated, as illustrated in FIG. 6B. That is, torque ripple is considerably reduced in this case.

Meanwhile, when the boost converter 420 is used, input current is controlled and, as such, an improvement in input power factor is achieved.

Figure 7:
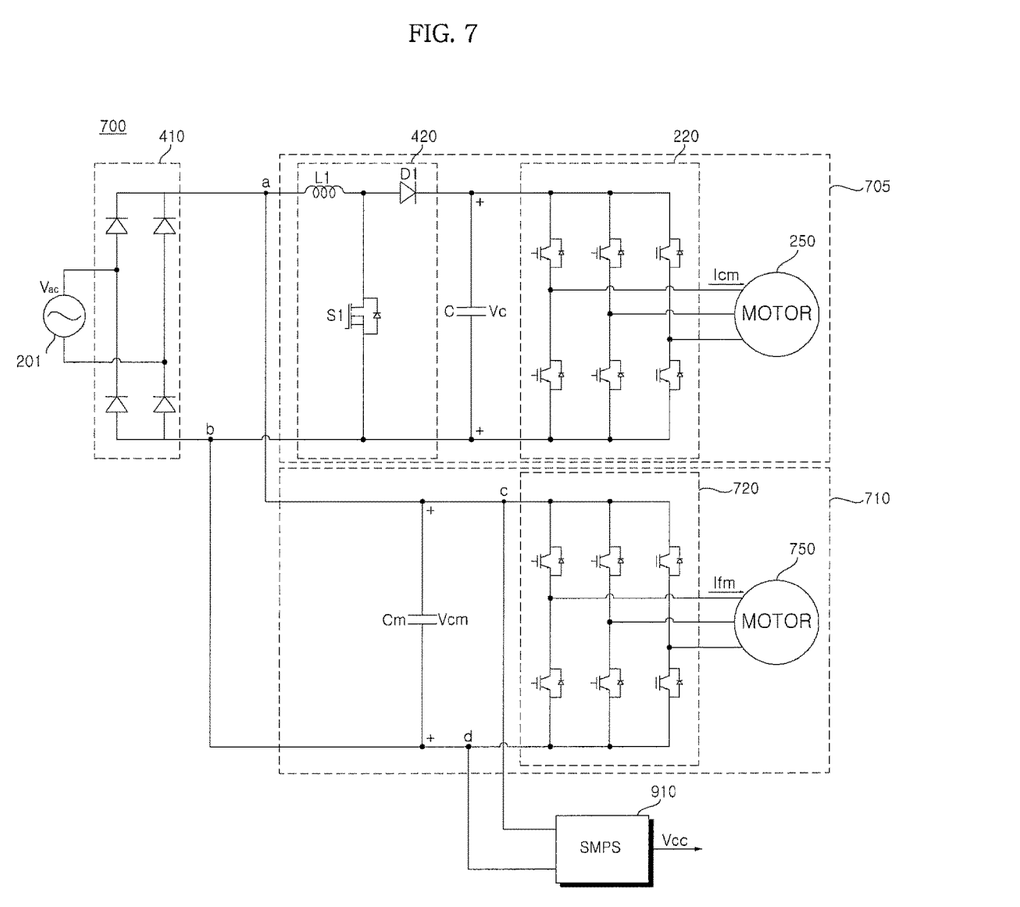
FIG. 7 is a circuit diagram illustrating a motor driving device according to an embodiment of the present invention.

FIG. 7 is a circuit diagram illustrating a motor driving device according to an embodiment of the present invention.

Referring to FIG. 7, the motor driving device, which is designated by reference numeral "700", may include a rectifier 410, a boost converter 420, a first capacitor C, a first inverter 220, a second capacitor Cm, a second inverter 720, and a voltage dropper 910.

The boost converter 420, first capacitor C, and first inverter 220 may constitute a compressor driving unit 705 for driving the compressor motor 250.

On the other hand, the second capacitor Cm and second inverter 720 may constitute a first fan motor driving unit 710 for driving a first fan motor 750.

The compressor motor 250 requires a high voltage, whereas the first fan motor 750 requires a lower voltage than that of the compressor motor 250.

When the circuit elements required to drive both the compressor motor 250 and the first fan motor 750 are built on a single board, for compactness of the motor driving device, the voltage required for the compressor motor 250 and the voltage required for the first fan motor 750 are preferably taken into consideration because the voltages are different.

Meanwhile, when a low-capacitance capacitor is used for a DC link, it is desirable to use the boost converter 420, as described above, because the voltage at the DC link is pulsated.

Accordingly, when both the compressor motor 250 and the first fan motor 750 are driven, using a common DC link voltage boosted by the boost converter 420, there is a burden to execute considerable voltage drop, for driving of the first fan motor 750.

In order to solve this problem, the rectifier 410 is used in common for driving of both the compressor motor 250 and the first fan motor 750 in accordance with the illustrated embodiment of the present invention.

In this case, it is possible to use the low-capacitance capacitor, the capacitor C, for driving of the compressor motor 250 and, as such, the first fan motor 750 may be stably driven by a lower voltage than that of the compressor motor 250.

In FIG. 7, the compressor driving unit 705 and first fan driving unit 710 are illustrated as being connected in parallel to opposite ends a and b of the rectifier 410, which rectifies the single-phase input AC power 201.

That is, the boost converter 420, first capacitor C, and compressor inverter 220 are arranged in this order between opposite ends a and b of the rectifier 410. In addition, the second capacitor Cm and fan inverter 720 are arranged in this order between opposite ends a and b of the rectifier 410.

The rectifier 410 is illustrated as having a configuration in which two pairs of arm switching elements are connected in parallel, and each arm switching element pair includes an upper arm switching element and a lower arm switching element, which are connected in series, such that the arm switching elements are connected in a bridged manner.

The boost converter 420 may include an inductor L1 and a diode D1, which are connected in series between the rectifier 410 and the first capacitor C. The boost converter 420 may further include a switching element S1 connected between the inductor L1 and the diode D1. When the switching element S1 turns on, energy is stored in the inductor L1. When the switching element S1 turns off, the energy stored in the inductor L1 may be output via the diode D1.

In particular, when the motor driving device 700 employs a low-capacitance film capacitor as the DC link capacitor C, a voltage boosted to a certain level, namely, an offset voltage, may be output from the boost converter 420.

Meanwhile, the first capacitor C preferably has a smaller capacitance than the second capacitor Cm. That is, the capacitance of the second capacitor Cm is preferably greater than the capacitance of the first capacitor C.

In addition, the level of the voltage Vc stored in the first capacitor C is preferably higher than the level of the voltage Vcm stored in the second capacitor Cm. The voltage Vc stored in the first capacitor C may have a level of about 450V, whereas the voltage Vcm stored in the second capacitor Cm may have a level of about 300V.

As a result, the first fan motor 750 may be stably driven in accordance with the DC voltage Vcm, which exhibits reduced pulsation.

Meanwhile, the voltage dropper 910 is connected between opposite ends c and d of the second capacitor Cm. The voltage dropper 910 drops a voltage Vcm across the second capacitor Cm, and outputs the dropped voltage.

For this function, the voltage dropper 910 may include a switch mode power supply (SMPS). In this case, the voltage dropper 910 may output operating voltages Vcc of about 15V, 7.5V, 5V, etc. Such operating voltages may be used as operating voltages of the inverter 220 and inverter controller 230.

Accordingly, it may be possible to drive the fan motor and to generate operating voltages, using the same capacitor, namely, the second capacitor Cm. Thus, easy design of the voltage dropper 910 may be achieved.

Figure 8:
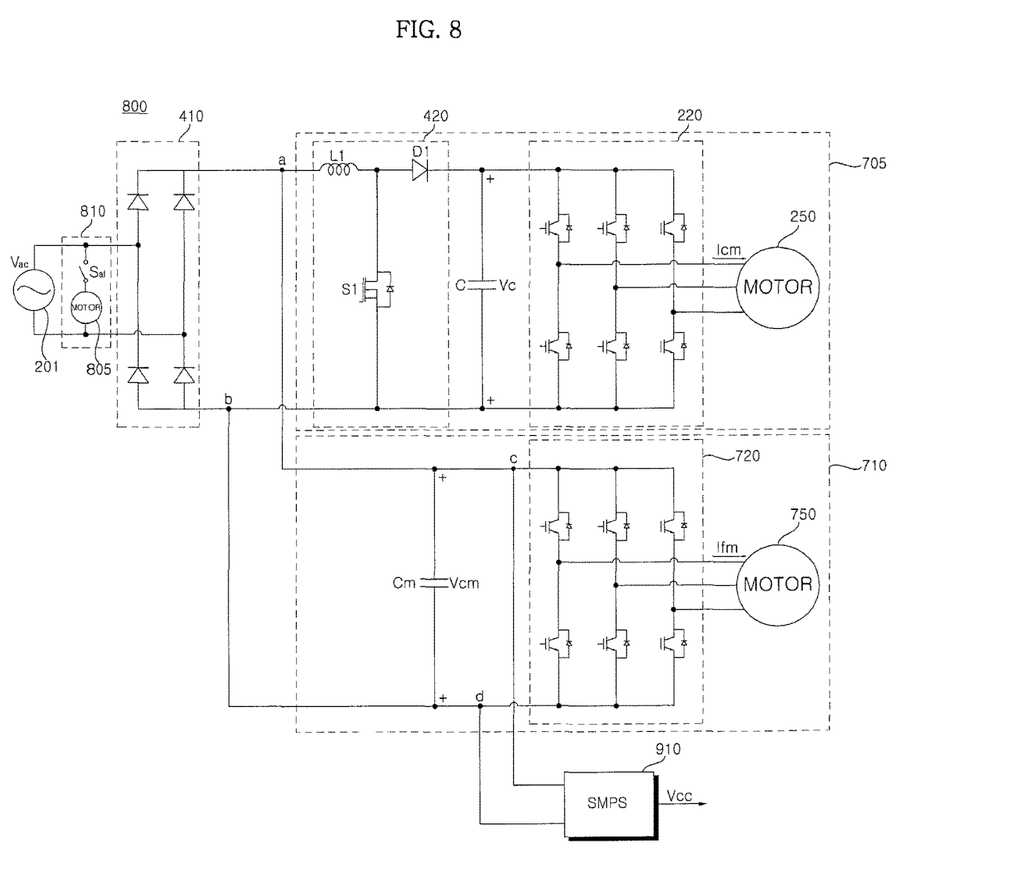

FIG. 8 is a circuit diagram illustrating a motor driving device according to another embodiment of the present invention.

Referring to FIG. 8, the motor driving device of FIG. 8, which is designated by reference numeral "800", is similar to the motor driving device 700 of FIG. 7, except that the motor driving device 800 may further include a fan switching element Saf arranged between the power source of single-phase AC power 201 and the rectifier 410.

In accordance with an ON operation of the fan switching element Saf, a second fan motor 805, which is of an AC type, is directly driven. In the motor driving device 800 of FIG. 8, accordingly, the compressor motor 250, first fan motor 750, and second fan motor 805 may be stably driven.

Figure 9:
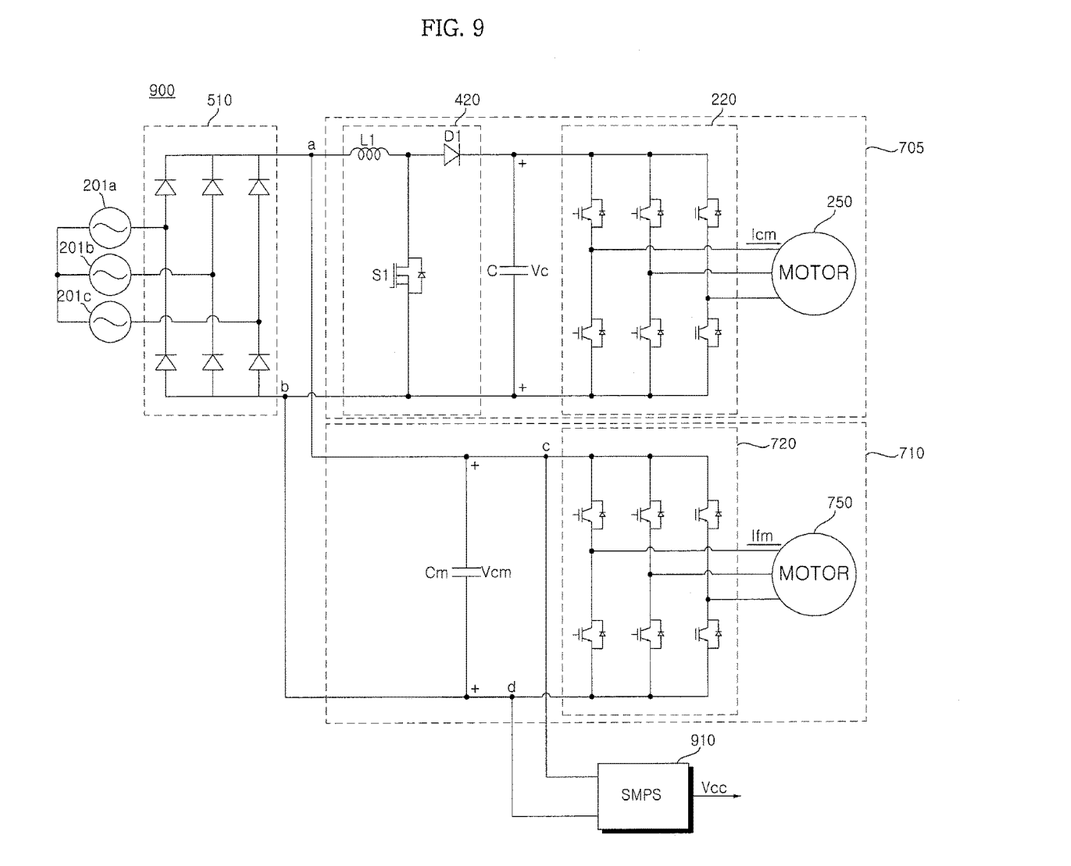
FIG. 9 is a circuit diagram illustrating a motor driving device according to another embodiment of the present invention.

FIG. 9 is a circuit diagram illustrating a motor driving device according to another embodiment of the present invention.

Referring to FIG. 9, the motor driving device of FIG. 9, which is designated by reference numeral "900", is similar to the motor driving device 700 of FIG. 7, except that 3-phase input AC power 201*a*, 201*b*, and 201*c* are used.

In this case, a rectifier 510 is used to rectify the 3-phase input AC power 201*a*, 201*b*, and 201*c* input thereto, and then to output the rectified power.

For this function, the rectifier 510 may include a 3-phase bridge diode. In this connection, FIG. 9 illustrates a configuration of the rectifier 510 in which three pairs of arm switching elements are connected in parallel, and each arm switching element pair includes an upper arm switching element and a lower arm switching element, which are connected in series, such that the arm switching elements are connected in a bridged manner.

Figure 10:
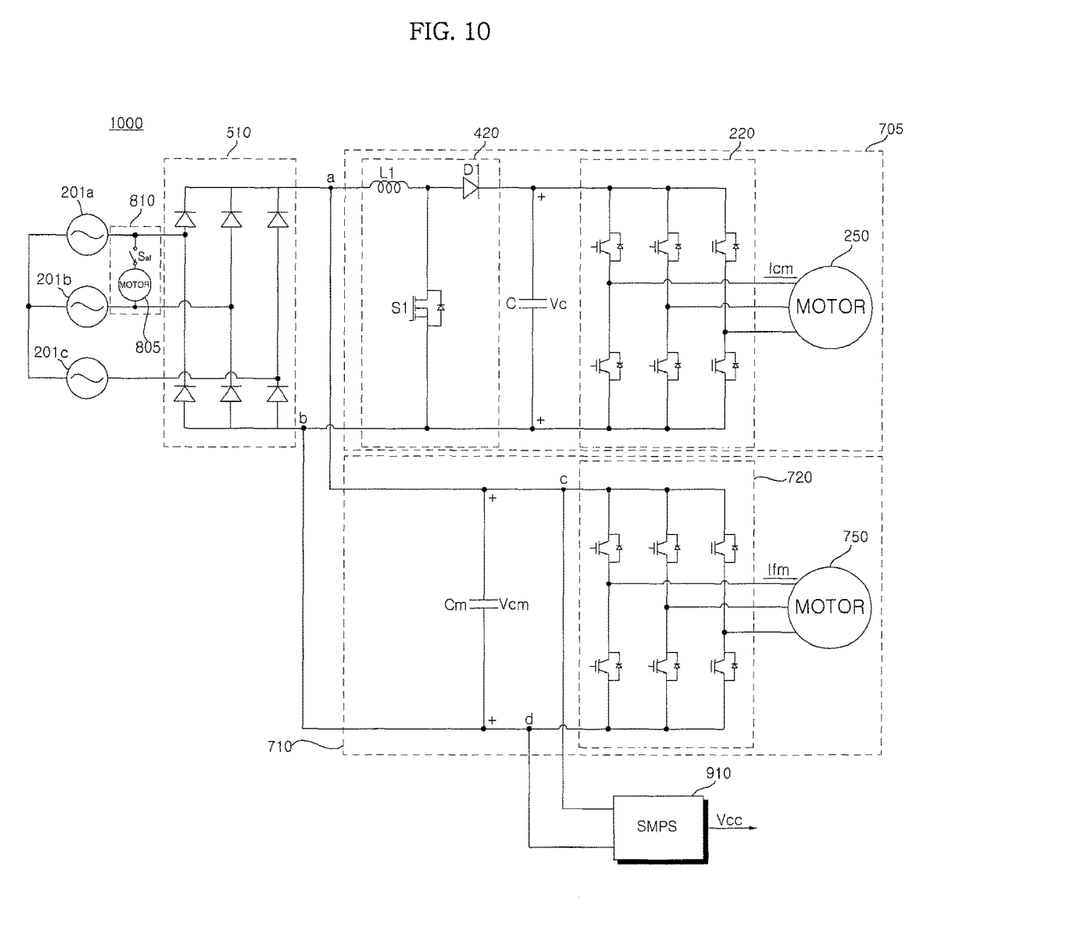

FIG. 10 is a circuit diagram illustrating a motor driving device according to another embodiment of the present invention.

Referring to FIG. 10, the motor driving device of FIG. 10, which is designated by reference numeral "1000", is similar to the motor driving device 900 of FIG. 9, except that the motor driving device 1000 may further include a fan switching element Saf arranged between two of the power sources of 3-phase AC power 201*a*, 201*b*, and 201*c*, for example, the power sources of AC power 201*a* and 201*b*.

In accordance with an ON operation of the fan switching element Saf, the second fan motor 805, which is of an AC type, is directly driven. In the motor driving device 1000 of FIG. 10, accordingly, the compressor motor 250, first fan motor 750, and second fan motor 805 may be stably driven.

Figure 11:
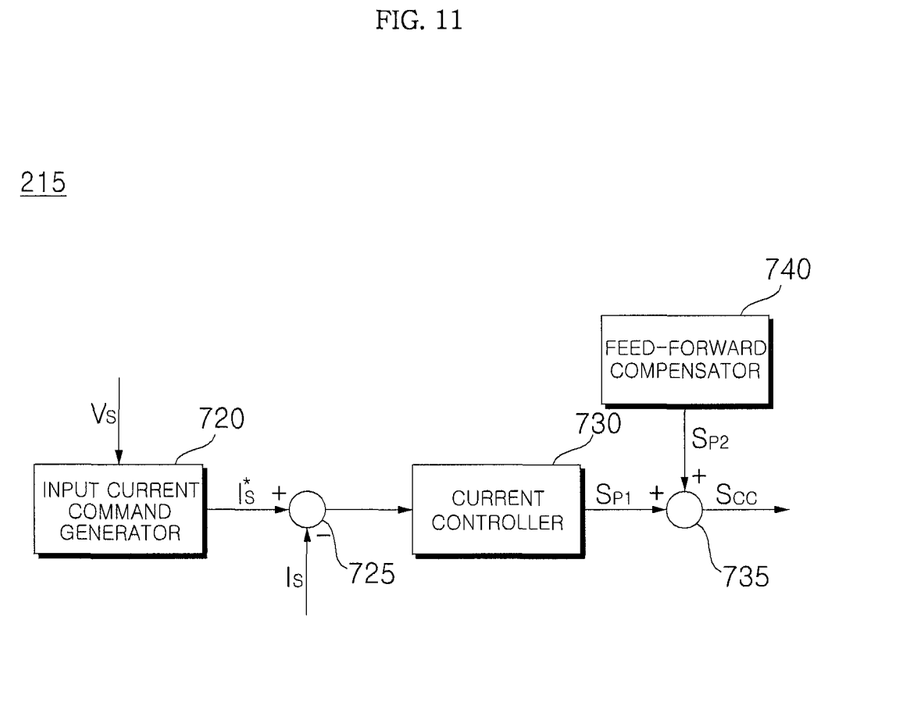
FIG. 11 is a block diagram illustrating an example of the inner configuration of the converter controller illustrated in FIG. 4.

FIG. 11 is a block diagram illustrating an example of the inner configuration of the converter controller illustrated in FIG. 4, Referring to FIG. 11, the converter controller 215 may include an input current command generator 720, a current controller 730, and a feed-forward compensator 740.

The input current command generator 720 may receive an input voltage Vs detected by the input voltage detector A, and may generate an input current command value I*s, based on the received input voltage Vs.

Meanwhile, the converter controller 215 may further include a substractor 725 to calculate a difference between the input current command value I*s and the input current Is detected by the input current detector D. The substractor 725 applies the calculated difference to the current controller 730.

The current controller 730 generates a first switching control signal Sp1 corresponding to a first duty, based on the input current command value I*s and an input current Is detected by the input current detector D.

In detail, the current controller 730 generates the first switching control signal corresponding to the first duty, based on a difference between the input current command value I*s and the input current Is.

Meanwhile, the feed-forward compensator 740 executes feed-forward compensation in order to remove disturbance of the input voltage Vs from the boost converter 420 and the DC link voltage Vdc. Accordingly, the feed-forward compensator 740 may generate a second switching control signal Sp2 corresponding to a second duty, taking into consideration removal of voltage disturbance.

The converter controller 215 may further include an adder 735 to add the second switching control signal Sp2 to the first switching control signal Sp1. The adder 735 may output a converter switching control signal Scc, based on results of the addition. That is, the adder 735 may output the converter switching control signal Scc, taking into consideration the first and second duties.

Meanwhile, the operation method of the motor driving device or air conditioner according to the present invention can be realized as code, which can be written on a recording medium that can be read by a processor equipped in the motor driving device or air conditioner and can be read by a processor. The recording medium that can be read by a processor includes all kinds of recording media, on which data that can be read by a processor is written, such as a read only memory (ROM), a random access memory (RAM), a CD-ROM, a magnetic tape, a floppy disk, an optical data storage, and a carrier wave type (e.g., transmission over the Internet). The recording medium that can be read by a processor can be distributed to computer systems connected to one another on a network, and codes that can be read by a processor can be stored in the recording medium in a distributed manner and executed.

As apparent from the above description, in accordance with the present invention, the above-described motor driving device and the air conditioner including the same may achieve driving of both a compressor motor and a fan motor, using the same input AC power, even when the motor driving device uses a low-capacitance capacitor, through a configuration of the motor driving device including a rectifier to rectify input AC power, a boost converter to boost the rectified power from the rectifier, and to output the boosted power, a first capacitor to store a pulsating voltage from the boost converter, a first inverter including a plurality of switching elements, the first inverter outputting, to a compressor motor, AC power transformed using a voltage across the first capacitor, a second capacitor to store the rectified power from the rectifier, a second inverter including a plurality of switching elements, the second inverter outputting, to a first fan motor, AC power transformed using a voltage across the second capacitor, and a voltage dropper to drop the voltage across the second capacitor, and to output the dropped voltage.

In addition, it may be possible to drive the fan motor and to generate operating voltages, using the same capacitor, namely, the second capacitor.

The voltage boosted by the boost converter is used in a compressor inverter, that is, the first inverter, and, as such, torque ripple generated during driving of the motor may be reduced.

In addition, an improvement in power factor may be achieved in accordance with use of the boost converter.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A motor driving device comprising:
a rectifier to rectify input alternate current (AC) power;
a boost converter to boost the rectified power from the rectifier, and to provide boosted power;
a first capacitor to store a pulsating voltage from the boost converter;
a first inverter that includes a plurality of switching elements, the first inverter to provide, to a compressor motor, AC power transformed using the pulsating voltage across the first capacitor;
a second capacitor to store voltage from the rectifier, wherein a capacitance of the first capacitor is less than a capacitance of the second capacitor;
a second inverter that includes a plurality of switching elements, the second inverter to provide, to a first fan motor, AC power transformed using a voltage across the second capacitor; and
a voltage dropper to drop the voltage across the second capacitor, and to provide the dropped voltage as operating voltages of the first inverter and the second inverter,
wherein the boost converter outputs the pulsating voltage having a first voltage level and a peak voltage level of the input AC power.

2. The motor driving device according to claim 1, further comprising:

a fan switching element between a power source of the input AC power and the rectifier, wherein a second fan motor is driven based on operation of the fan switching element.

3. The motor driving device according to claim 1, wherein a voltage in the first capacitor is higher than a voltage in the second capacitor.

4. The motor driving device according to claim 1, wherein the first capacitor is a film capacitor.

5. The motor driving device according to claim 1, wherein the boost converter includes:
an inductor and a diode connected in series between the rectifier and a node of the first capacitor; and
a switching element connected to a node between the inductor and the diode.

6. The motor driving device according to claim 1, further comprising:
an input current detector to detect input current from the input AC power;
an input voltage detector to detect input voltage from the input AC power; and
a converter controller to provide, based on the detected input current and the detected input voltage, a converter control signal to control a switching element of the boost converter.

7. The motor driving device according to claim 1, further comprising:
a direct current (DC) link voltage detector, between the boost converter and the first inverter, to detect a first DC link voltage;
an output current detector to detect an output current flowing to the compressor motor; and
an inverter controller to control the first inverter, based on the detected DC link voltage and the detected output current.

8. The motor driving device according to claim 6, wherein the converter controller includes:
an input current command generator to provide, based on the detected input voltage, an input current command value; and
a current controller to provide a first switching control signal, based on the detected input current and the input current command value.

9. The motor driving device according to claim 8, wherein:
the converter controller further includes a feed-forward compensator to provide a second switching control signal; and
the converter controller provides the converter switching control signal, based on the first switching control signal and the second switching control signal.

10. An air conditioner comprising:
a compressor to compress refrigerant;
a heat exchanger to perform heat exchange using the compressed refrigerant; and
a compressor motor driving device to drive a compressor motor,
wherein the compressor motor driving device includes:
a rectifier to receive alternate current (AC) power;
a boost converter to boost power from the rectifier, and to provide the boosted power;
a first capacitor to store a pulsating voltage from the boost converter;
a first inverter to receive the pulsating voltage from the first capacitor, and to provide transformed AC power to the compressor motor;
a second capacitor to store power from the rectifier, wherein a capacitance of the first capacitor is less than a capacitance of the second capacitor;
a second inverter to receive voltage from the second capacitor, and to provide transformed AC power to a first fan motor; and
a voltage dropper to drop the voltage across the second capacitor, and to provide the dropped voltage as operating voltages of the first inverter and the second inverter,
wherein the boost converter outputs the pulsating voltage having a first voltage level and a peak voltage level of the input AC power.

11. The air conditioner according to claim 10, wherein the compressor motor driving device further includes:
a fan switching element between a power source of the input AC power and the rectifier, wherein the fan switching element to control operation of a second fan motor.

12. The air conditioner according to claim 10, wherein a voltage in the first capacitor is higher than a voltage in the second capacitor.

13. The air conditioner according to claim 10, wherein the first capacitor is a film capacitor.

14. The air conditioner according to claim 10, wherein the boost converter includes:
an inductor and a diode connected in series between the rectifier and a node of the first capacitor; and
a switching element connected to a node between the inductor and the diode.

15. The air conditioner according to claim 10, wherein the compressor motor driving device further includes:
an input current detector to detect input current from the received AC power;
an input voltage detector to detect input voltage from the received AC power; and
a converter controller to provide a converter control signal to control a switching element of the boost converter, based on the detected input current and the detected input voltage.

16. The air conditioner according to claim 10, wherein the compressor motor driving device further includes:
a direct current (DC) link voltage detector, between the boost converter and the first inverter, to detect a first DC link voltage between the boost converter and the first inverter;
an output current detector to detect an output current to the compressor motor; and
an inverter controller to control the first inverter, based on the detected DC link voltage and the detected output current.

17. The air conditioner according to claim 15, wherein the converter controller includes:
an input current command generator to provide, based on the detected input voltage, an input current command value; and
a current controller to provide a first switching control signal, based on the detected input current and the input current command value.

18. The air conditioner according to claim 17, wherein:
the converter controller further includes a feed-forward compensator to provide a second switching control signal; and
the converter controller provides the converter switching control signal, based on the first switching control signal and the second switching control signal.

* * * * *